No. 771,571. PATENTED OCT. 4, 1904.
W. B. PEARSON.
CRANK PIN LUBRICATOR.
APPLICATION FILED SEPT. 18, 1903.
NO MODEL.
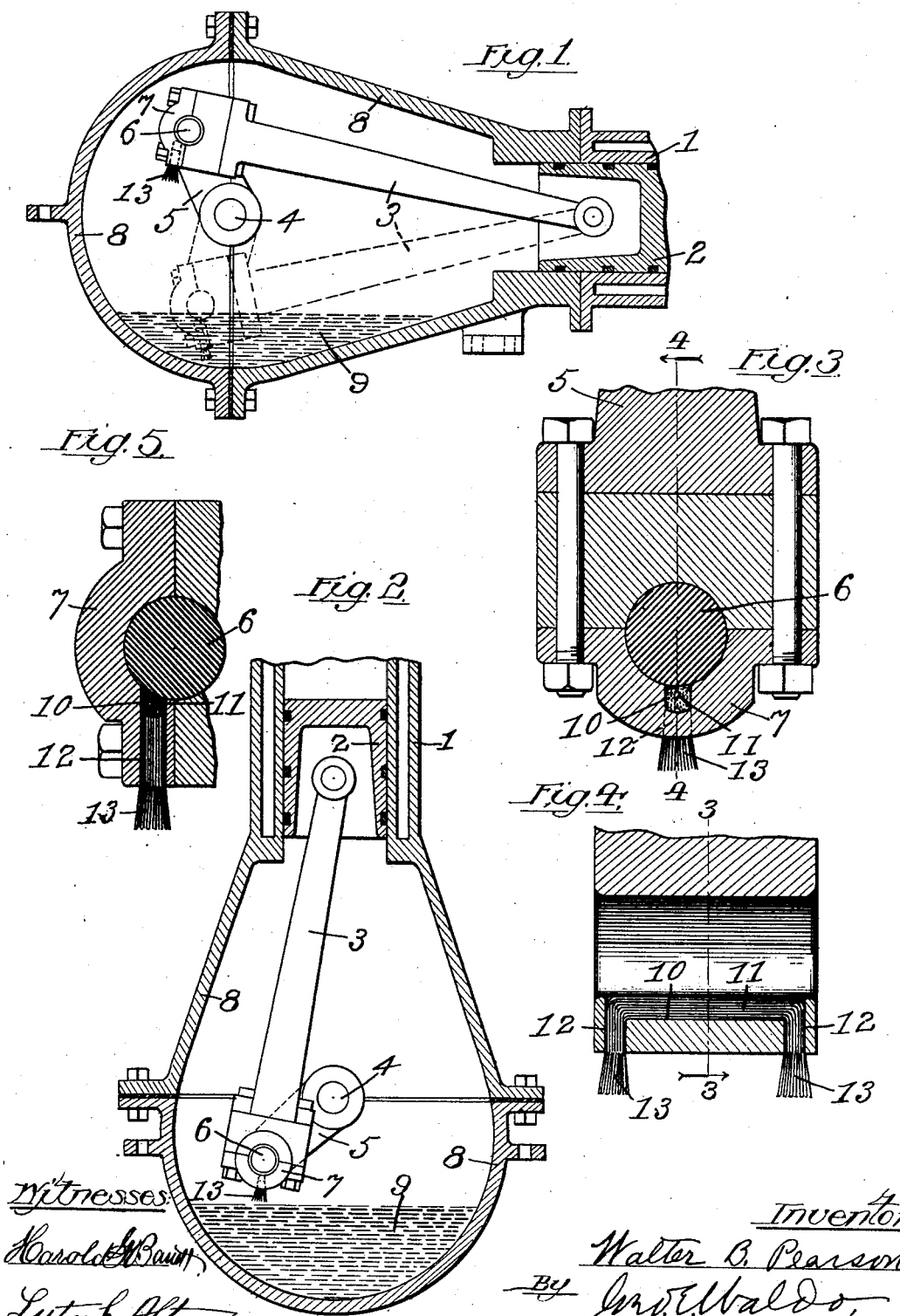
Witnesses
Harold W Bain
Luter F Alter
Inventor
Walter B. Pearson,
By Jno. E. Waldo,
Atty.

No. 771,571.

Patented October 4, 1904.

UNITED STATES PATENT OFFICE.

WALTER B. PEARSON, OF CHICAGO, ILLINOIS.

CRANK-PIN LUBRICATOR.

SPECIFICATION forming part of Letters Patent No. 771,571, dated October 4, 1904.

Application filed September 18, 1903. Serial No. 173,661. (No model.)

*To all whom it may concern:*

Be it known that I, WALTER B. PEARSON, a citizen of the United States, residing at Chicago, Cook county, Illinois, have invented certain new and useful Improvements in Crank-Pin Lubricators, of which the following is a specification.

This invention relates to lubricators, and relates particularly to means for lubricating the crank-pin bearings of high-speed engines, such as gas and gasolene engines, in common use for propelling automobiles. In engines of this type the crank and adjunctive parts are very commonly inclosed in a suitable casing, and the various bearings are lubricated by means of lubricant contained in said casing, through which the crank passes in turning. Great difficulty has, however, been experienced in properly lubricating the crank-pin bearings, due to its centrifugal force, which operates to throw the oil outwardly away from the crank-pin.

The object of the invention is to overcome the above objectionable features by providing means to thoroughly lubricate the crank-pin bearings of engines of this type.

To this end my invention consists of the various features, combinations of features, and details of construction hereinafter described and claimed.

In the accompanying drawings a lubricating device of my invention is fully illustrated.

Figure 1 is a partial sectional side elevation of a horizontal engine equipped with a lubricating device of my invention. Fig. 2 is a similar view of a vertical or upright engine. Figs. 3 and 4 are enlarged detail sectional views of the crank-pin bearing shown in Fig. 2, and Fig. 5 is a view similar to Fig. 3 of the bearing shown in Fig. 1.

Referring now to the drawings, 1 designates the cylinder of an explosive-engine, gas or gasolene; 2, the piston thereof; 3, the connecting-rod; 4, the crank-shaft; 5, the crank; 6, the crank-pin; 7, the cap of the crank-pin bearing; 8, a casing inclosing the crank and adjunctive parts, and 9 a quantity of lubricant contained in said casing through which the crank passes in turning. All of the foregoing parts are old and well known in the art and will be readily understood from an inspection of the drawings without a detailed description thereof.

The means for lubricating the crank-pin bearing are as follows: Formed in the bottom or lower side of said crank-pin bearing is a transverse groove 10, contained in which is an absorbent packing 11, preferably wicking or the like. In the preferable construction shown the groove 10 communicates with holes or openings 12, formed adjacent to the lateral sides of the crank-pin bearing and which extend from said groove through the lower or under side of the bearing-box. The ends of the wick or packing 11 are inserted through said holes or openings 12, which operates to secure said wicking in said groove and also to lead said wicking downwardly, so that the ends thereof will enter the lubricant contained in the casing 8, even though the level of the lubricant be considerably below the bottom of the crank-pin when in its lowest position. The ends of the packing or wicking 11 preferably project beyond or outside of the holes or openings 12 and are left free or uncombined, so that they will form, in effect, brushes 13, which will quickly take up or absorb a considerable quantity of the lubricant each time they pass through the same. Thus when the level of the lubricant 9 is sufficiently high for the brushes 13 to dip into the same said brushes will always be thoroughly soaked with the lubricant when the engine is running. From the brushes 13 the capillary attraction of the wicking operates to draw the lubricant into all parts thereof, and said wicking or packing being on the under side of said bearing the centrifugal force due to the rapid revolution of the crank will operate in a familiar manner to force the lubricant from said wicking onto the surface of the crank-pin as said crank passes through the upper portion of its revolution. For convenience of construction the groove 10 and holes or openings 12 are formed entirely in the cap of the bearing. This, however, is not essential, and such groove and holes may be formed in any portion of the bearing on the under side of said crank-pin.

I claim as my invention—

1. In a crank-pin-bearing lubricator, the combination with the crank-pin and its bearing member, of a groove provided in said bearing member at the under side of said crank-pin, an absorbent packing in said groove and means to supply lubricant to said packing, substantially as described.

2. In a crank-pin-bearing lubricator, the combination with the crank-pin and its bearing member, of a groove provided in said bearing member at the under side of said crank-pin, an absorbent packing in said groove and a lubricant-receptacle beneath said crank-pin bearing, substantially as described.

3. In a crank-pin-bearing lubricator, the combination with the crank-pin and its bearing member, of a groove provided in said bearing member at the under side of said crank-pin, an absorbent packing in said groove which projects outside of said bearing member and a lubricant-receptacle beneath said crank-pin bearing, substantially as described.

4. In a crank-pin-bearing lubricator, the combination with the crank-pin and its bearing member, of a groove provided in said bearing member at the under side of said crank-pin and a hole or opening extending downwardly from said groove through said bearing member, absorbent packing in said groove and hole, and a lubricant-receptacle beneath said crank-pin bearing, substantially as described.

5. In a crank-pin-bearing lubricator, the combination with the crank-pin and its bearing member, of a groove at the under side of said crank-pin and a hole or opening which extends downwardly from said groove through said bearing member, absorbent packing in said groove and hole which projects outside of said bearing member and a lubricant-receptacle beneath said crank-bearing, substantially as described.

6. In a crank-pin-bearing lubricator, the combination with the crank-pin and its bearing member, of a groove provided in said bearing member at the under side of said crank-pin, and holes or openings which extend downwardly from said groove through said bearing member adjacent to the sides of said bearing member, an absorbent packing in said groove and holes which project outside of said bearing member and a lubricant-receptacle beneath said crank-bearing, substantially as described.

7. In a crank-pin-bearing lubricator, the combination with the crank-pin and its bearing member, said bearing member comprising a removable cap, of a groove provided in said cap at the under side of said crank-pin and a hole or opening in said cap which extends downwardly through said cap, an absorbent packing in said groove and hole and a lubricant-receptacle beneath said crank-pin bearing, substantially as described.

In testimony that I claim the foregoing as my invention I affix my signature, in presence of two subscribing witnesses, this 12th day of September, A. D. 1903.

WALTER B. PEARSON.

Witnesses:
HENRY W. CARTER,
K. A. CASTELLO.